US011129054B2

(12) United States Patent
Xu et al.

(10) Patent No.: US 11,129,054 B2
(45) Date of Patent: *Sep. 21, 2021

(54) METHODS, SYSTEMS AND DEVICES FOR SUPPORTING LOCAL BREAKOUT IN SMALL CELL ARCHITECTURE

(71) Applicant: Samsung Electronics Co., Ltd., Suwon-si (KR)

(72) Inventors: Lixiang Xu, Beijing (CN); Xiaowan Ke, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

This patent is subject to a terminal disclaimer.

(21) Appl. No.: 16/524,932

(22) Filed: Jul. 29, 2019

(65) Prior Publication Data
US 2019/0349812 A1 Nov. 14, 2019

Related U.S. Application Data

(63) Continuation of application No. 14/910,494, filed as application No. PCT/KR2014/007131 on Aug. 1, 2014, now Pat. No. 10,368,268.

(30) Foreign Application Priority Data

Aug. 5, 2013 (CN) .......................... 201310337253.3

(51) Int. Cl.
*H04W 28/10* (2009.01)
*H04W 92/20* (2009.01)
(Continued)

(52) U.S. Cl.
CPC .......... *H04W 28/10* (2013.01); *H04W 8/082* (2013.01); *H04W 16/08* (2013.01); *H04W 16/32* (2013.01);
(Continued)

(58) Field of Classification Search
CPC . H04W 28/0289; H04W 8/082; H04W 16/08; H04W 16/32; H04W 36/12;
(Continued)

(56) References Cited

U.S. PATENT DOCUMENTS 8,295,830 B1 * 10/2012 Faccin ................ H04L 65/1016
455/432.1
8,432,871 B1 * 4/2013 Sarnaik ............. H04W 28/0289
370/331
(Continued)

FOREIGN PATENT DOCUMENTS

CN 102076038 A 5/2011
CN 102088771 A 6/2011
(Continued)

OTHER PUBLICATIONS

3GPP TSG RAN WG2 Meeting #81 bis. Research in Motion et al., R2-131374, Architecture Enhancement for Small Cells, 3GPP TSG RAN WG2 #81bis. Chicago, Apr. 15-19, 2013. pp. 1-5.
(Continued)

*Primary Examiner* — Warner Wong
(74) *Attorney, Agent, or Firm* — Jefferson IP Law, LLP

(57) ABSTRACT

The present disclosure discloses methods, systems and devices for supporting local breakout in a small cell architecture. An MME sends information of a local breakout bearer for a UE to a MeNB, and the MeNB determines a local home network to which the local breakout bearer belongs according to the received information. When the MeNB is to switch the local breakout bearer between different eNBs, the MeNB selects an eNB in the local home network to which the local breakout bearer belongs as a target eNB. By the present disclosure, the continuity of local breakout traffic may be ensured when a User Equipment (UE) moves in a small cell scenario, thereby avoiding data loss and improving user experiences. Further, a local break-
(Continued)

out bearer may be released timely and reasonably, thereby saving system resources.

16 Claims, 10 Drawing Sheets

(51) Int. Cl.

| | |
|---|---|
| *H04W 8/08* | (2009.01) |
| *H04W 36/12* | (2009.01) |
| *H04W 28/02* | (2009.01) |
| *H04W 76/10* | (2018.01) |
| *H04W 16/08* | (2009.01) |
| *H04W 16/32* | (2009.01) |
| *H04W 8/14* | (2009.01) |
| *H04W 84/04* | (2009.01) |
| *H04W 88/16* | (2009.01) |

(52) U.S. Cl.
CPC ..... *H04W 28/0289* (2013.01); *H04W 36/125* (2018.08); *H04W 76/10* (2018.02); *H04W 92/20* (2013.01); *H04W 8/14* (2013.01); *H04W 84/045* (2013.01); *H04W 88/16* (2013.01)

(58) Field of Classification Search
CPC ..... H04W 76/02; H04W 92/20; H04W 28/00; H04W 28/02; H04W 28/10–16; H04W 8/00; H04W 8/08; H04W 8/14; H04W 16/00; H04W 16/02–08; H04W 16/24; H04W 36/00; H04W 36/125; H04W 76/00; H04W 76/10; H04W 76/15; H04W 92/00; H04W 92/16; H04W 5/0035; H04L 5/0035; H04L 12/2861; H04L 29/06326; H04L 45/16; H04L 47/15
See application file for complete search history.

(56) References Cited

U.S. PATENT DOCUMENTS

| | | | |
|---|---|---|---|
| 2010/0128709 A1 | 5/2010 | Liu et al. | |
| 2011/0026463 A1* | 2/2011 | Lair | H04W 76/22 370/328 |
| 2011/0069659 A1* | 3/2011 | Kong | H04W 48/06 370/328 |
| 2011/0235595 A1* | 9/2011 | Mehta | H04W 8/082 370/329 |
| 2011/0235605 A1* | 9/2011 | Yeoum | H04W 72/04 370/329 |
| 2011/0292896 A1 | 12/2011 | Yeuom et al. | |
| 2011/0310791 A1 | 12/2011 | Prakash et al. | |
| 2012/0002590 A1 | 1/2012 | Sato | |
| 2012/0046058 A1 | 2/2012 | Vesterinen et al. | |
| 2012/0076121 A1 | 3/2012 | Choi et al. | |
| 2012/0108240 A1 | 5/2012 | Liu et al. | |
| 2012/0120939 A1* | 5/2012 | Korhonen | H04W 8/082 370/338 |
| 2012/0182972 A1 | 7/2012 | Guan et al. | |
| 2012/0269162 A1 | 10/2012 | Vesterinen et al. | |
| 2012/0294283 A1 | 11/2012 | Liang et al. | |
| 2013/0003697 A1 | 1/2013 | Adjakple et al. | |
| 2013/0010753 A1 | 1/2013 | Chen et al. | |
| 2013/0028237 A1 | 1/2013 | Cheng et al. | |
| 2013/0029708 A1 | 1/2013 | Fox et al. | |
| 2013/0034058 A1 | 2/2013 | Xi et al. | |
| 2013/0058292 A1 | 3/2013 | Wang et al. | |
| 2013/0121250 A1* | 5/2013 | Anthony, Jr. | H04W 28/08 370/328 |
| 2013/0331105 A1 | 12/2013 | Olofsson et al. | |
| 2013/0336207 A1* | 12/2013 | Billau | H04W 36/125 370/328 |
| 2014/0119340 A1 | 5/2014 | Stojanovski et al. | |
| 2014/0169286 A1* | 6/2014 | Xu | H04W 8/082 370/329 |
| 2014/0177590 A1 | 6/2014 | Sirotkin et al. | |
| 2014/0376512 A1 | 12/2014 | Jeong et al. | |
| 2015/0146532 A1 | 5/2015 | Stojanovski et al. | |
| 2016/0007346 A1 | 1/2016 | Sirotkin et al. | |
| 2016/0323926 A1 | 11/2016 | Gao et al. | |
| 2017/0332272 A1 | 11/2017 | Adjakple et al. | |

FOREIGN PATENT DOCUMENTS

| | | | |
|---|---|---|---|
| CN | 102238703 A | 11/2011 | |
| CN | 102349318 A | 2/2012 | |
| CN | 102948195 A | 2/2013 | |
| CN | 103155685 A | 6/2013 | |
| KR | 2013-0035987 A | 4/2013 | |
| WO | 2008-125729 A1 | 10/2008 | |
| WO | WO2010115313 | * 10/2010 | ............ H04W 36/00 |
| WO | 2012/177023 A1 | 12/2012 | |

OTHER PUBLICATIONS

3GPP, TR36.842 v0.2.0, (Release 12), 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12). pp. 1-38.

Korean Office Action dated Jun. 10, 2020, issued in Korean Application No. 10-2016-7006055.

3GPP; 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects; (Release 12); V0.2.0; May 2013.

"3rd Generation Partnership Project; Technical Specification Group Services and System Aspects; Local IP access (LIPA) mobility and Selected IP Traffic Offload (SIPTO) at the local network (Release 12)", 3GPP Draft; 23859-COI, 3rd Generation Partnership Project (3GPP), Mobile Competence Centre; 650, Route Des Lucioles ; F-06921 Sophia-Antipolis Cedex ; France, Jul. 23, 2013, XP050725535 Retrieved from the Internet: URL:http://www.3gpp.org/ftp/tsg sa/WG2 Arch/Latest SA2 Specs/Rel-12, pp. 25-415.

CATT: "Using the LHN id for connected mode mobility procedures", 3GPP Draft; S2-113346, 3rd Generation Partnership Project (3GPP), Mobile Competence Centre; 650, Route Des Lucioles ; F-06921 Sophia-Antipolis Cedex; France, vol. SA WG2, No. Naantali; Jul. 11, 2011, Jul. 5, 2011, XP050548626, pp. 1-2.

Ericsson et al: "SIPTOLAMBDAN Arch soln 1, Open issues resolution", 3GPP Draft; S2-124900_4842_4703_4517_SIPTO_LN_PA8, 3rd Generation Partnership Project(3GPP), Mobile Competence Centre; 650, Route Des Lucioles ; F-06921 Sophia-Antipolis Cedex; France vol. SA WG2, No. New Orleans, USA; Nov. 12, 2012-Nov. 16, 2012, Nov. 16, 2012, XP050684506, Retrieved from the Internet: URL:http://www.3gpp.org/ftp/tsg sa/WG2_Arch/TSGS2 94 New Orleans/Docs/, the whole document.

Nokia Siemens Networks (Rapporteur): "Email Discussion Report on U-Plane Alternatives [81bis#19]", 3GPP Draft; R2-131621 SCE UPLANE Email Discussion, 3rd Generation Partnership Project (3GPP), Mobile Competence Centre; 650, Route Des Lucioles ; F-06921 Sophia-Antipolis Cedex; France vol. RAN WG2, No. Fukuoka, Japan; May 20, 2013 May 24, 2013 May 10, 2013, XP050699806,Retrieved from the Internet: URL:http://www.3gpp.org/ftp/tsg ran/WG2 RL2/TSGR2 82/Docs/, pp. 3, 9-13.

NEC Corporation: "Relevance of LIPA/SIPTO in SCE U-plane architecture discussions", 3GPP Draft; R2-131999 LIPA SIPTO, 3rd Generation Partnership Project (3GPP), Mobile Competence Centre; 650, Route Des Lucioles ; F-06921 Sophia-Antipolis Cedex; France vol. RAN WG2, No. Fukuoka, Japan; May 20, 2013-May 24, 2013, May 10, 2013, XP050699963, Retrieved from the Internet: URL:http://www.3gpp.org/ftp/tsg ran/WG2 RL2/TSGR2 82/Docs/, section 2.

Samsung: "Discussion on SeNB local break-out using LIPA and SIPTOLAMBDAN", 3GPP Draft; R2-132563, 3rd Generation Part-

(56) References Cited

OTHER PUBLICATIONS nership Project (3GPP), Mobile Competence Centre; 650, Route Des Lucioles ; F-06921 Sophia-Antipolis Cedex; France vol. RAN WG2, No. Barcelona, Spain;Aug. 19, 2013-Aug. 23, 2013 Aug. 9, 2013 (Aug. 9, 2013), XP050718237, Retrieved from the Internet: URL:http://www.3gpp.org/ftp/tsg ran/WG2 RL2/TSGR2 83/Docs/, section 2.

Sharp, "Minimising Signalling load for Small cell scenarios", 3GPP TSG-RAN WG2 #81Bis, R2-131202, Chicago, US A, Apr. 15-19, 2013.

Chinese Office Action dated Aug. 2, 2018, issued in Chinese Patent Application No. 201310337253.3.

Chinese Office Action dated Mar. 5, 2019, issued in Chinese Patent Application No. 201310337253.3.

* cited by examiner

METHODS, SYSTEMS AND DEVICES FOR SUPPORTING LOCAL BREAKOUT IN SMALL CELL ARCHITECTURE

CROSS-REFERENCE TO RELATED APPLICATION(S)

This application is a continuation application of prior application Ser. No. 14/910,494, filed on Feb. 5, 2016, which was a U.S. National Stage application under 35 U.S.C. § 371 of an International application number PCT/KR2014/007131 filed on Aug. 1, 2014, which was based on and claimed priority under 35 U.S.C § 119(a) of a Chinese patent application number 201310337253.3, filed on Aug. 5, 2013, in the Chinese Intellectual Property Office, the disclosure of each of which is incorporated by reference herein in its entirety.

TECHNICAL FIELD

The present disclosure relates to radio communication technologies, and more particularly to methods, systems and devices for supporting local breakout in a small cell architecture.

BACKGROUND ART

Modern mobile communication technology tends to provide high-rate multimedia services for users. FIG. 1 is a diagram illustrating the structure of a System Architecture Evolution (SAE).

In FIG. 1, a User Equipment (UE) 101 is a terminal device for receiving data. An Evolved Universal Terrestrial Radio Access Network (E-UTRAN) 102 is a radio access network which includes an eNodeB/NodeB for providing a radio network interface for the UE. A Mobile Management Entity (MME) 103 is configured to manage mobility contexts, session contexts and security information of the UE. A Serving Gateway (SGW) 104 is configured to provide functions of a subscriber plane. The MME 103 and the SGW 104 may be located in the same physical entity. A Packet Gateway (PGW) 105 is configured to implement charging and legal monitoring functions. The PGW 105 and the SGW 104 may be located in the same physical entity. A Policy and Charging Rules Function (PCRF) 106 is configured to provide QoS policies and charging rules. A Service GPRS Supporting Node (SGSN) 108 is a network node device for providing routing for data transmission in a Universal Mobile Telecommunications System (UMTS). A Home Subscriber Server (HSS) 109 is a home subsystem of the UE and is configured to protect user information including the current location of the UE, the address of a serving node, user security information and packet data contexts of the UE.

DISCLOSURE OF INVENTION

Technical Problem

In 3GPP Release-12 (Rel-12), the requirement on the enhancement of small cell is put forward. Target scenarios for the enhancement of small cell include a scenario that is covered by a macro cell and a scenario that is not covered by a macro cell. The enhancement of indoor, outdoor, ideal and non-ideal backhaul is shown in FIG. 2.

In the scenario that is covered by a macro cell, a technology for Carrier Aggregation (CA) among different eNBs is introduced. A macro cell and a small cell may work on different frequencies. The technology for CA among different eNBs may be implemented through multiple architectures, for example, an architecture based on the Radio Access Network (RAN) split and an architecture based on Core Network (CN) split. In the architecture based on CN split, user plane data may be sent to a pico cell directly by an SGW of the CN through a bearer established in the pico cell without being forwarded by a macro cell.

If local breakout in a small cell architecture is supported, the load of backhaul may be reduced. However, an architecture supporting the local breakout in a small cell architecture has not been put forward.

Solution to Problem

The present disclosure provides a method for supporting local breakout in a small cell architecture. By the method, the continuity of local breakout traffic may be ensured when a User Equipment (UE) moves in a small cell, thereby avoiding data loss and improving user experiences. Further, a local breakout bearer may be released timely and reasonably, thereby saving system resources.

The solution of the present disclosure is implemented as follows.

A system for supporting local breakout in a small cell architecture includes a Master eNB (MeNB) and a Secondary eNB (SeNB);
  the MeNB comprises a Local Gateway (LGW) unit that is configured to perform functions of an LGW;
  the MeNB is configured to receive local breakout traffic, and send the local breakout traffic to the SeNB; and
  the SeNB is configured to receive the local breakout traffic from the MeNB, and send the local breakout traffic to a User Equipment (UE).

A Secondary eNB (SeNB) for supporting local breakout in a small cell architecture,
  includes a Local Gateway (LGW) unit configured to perform functions of an LGW; and
  is configured to receive local breakout traffic, and send the local breakout traffic to a User Equipment (UE).

A system for supporting local breakout in a small cell architecture includes a Master eNB (MeNB), a Local Gateway (LGW) and a Secondary eNB (SeNB);
  the LGW is configured to perform functions of the LGW and a Serving Gateway (SGW);
  the MeNB is configured to receive local breakout traffic through the LGW, and send the local breakout traffic to a User Equipment (UE); and
  the SeNB is configured to receive the local breakout traffic through the LGW, and send the local breakout traffic to the UE.

A system for supporting local breakout in a small cell architecture includes a Master eNB (MeNB), a Local Gateway (LGW) and a Secondary eNB (SeNB);
  the LGW is configured to perform functions of the LGW and a Serving Gateway (SGW);
  the MeNB is configured to receive local breakout traffic through the LGW, and send the local breakout traffic to the SeNB; and
  the SeNB is configured to receive the local breakout traffic from the MeNB, and send the local breakout traffic to a User Equipment (UE).

A method for supporting local breakout in a small cell architecture includes:
  a) sending, by a Mobile Management Entity (MME), information of a local breakout bearer for a User Equipment (UE) to a Master eNB (MeNB), and determining, by the MeNB, a local home network to which the local breakout bearer belongs according to the received information; and b) when the MeNB is to switch the local breakout bearer between different eNBs, selecting, by the MeNB, an eNB in the local home network to which the local breakout bearer belongs as a target eNB.

Before the MME sends the information of the local breakout bearer for the UE to the MeNB, the method further includes:

obtaining, by the MeNB, a local home network ID of a SeNB, and sending to the MME the local home network ID of the MeNB and/or the local home network ID of the SeNB; and determining, by the MME, to establish the local breakout bearer for the UE according to a local breakout bearer establishment request of the UE, the local home network ID received from the eNB to which the UE accessed and subscription information of the UE.

When the MME receives one local home network ID, the information of the local breakout bearer is a local breakout bearer indication to inform the MeNB that the local breakout bearer is established for the UE.

The MeNB determines the local home network to which the local breakout bearer belongs according to the local breakout bearer indication received from the MME and the local home network ID sent to the MME.

The information of the local breakout bearer comprises the ID of the local home network to which the local breakout bearer belongs.

The MeNB determines the local home network to which the local breakout bearer belongs according to the ID of the local home network where the local breakout bearer is established.

The obtaining, by the MeNB, the local home network ID of the SeNB comprises:

obtaining, by the MeNB, the local home network ID v through an X2 establishment process, configuration of an operator or an Automatic Neighbor Relation (ANR) process; or sending, by the MeNB, a SeNB addition request to the SeNB during a process of establishing a bearer in the SeNB for the UE, wherein a SeNB addition response returned to the MeNB by the SeNB contains the ID of the local home network to which the SeNB belongs.

The SeNB addition response contains the local home network ID of the SeNB when the SeNB addition request indicates the information of the local breakout bearer.

A method for supporting local breakout in a small cell architecture includes:

switching, by a Master eNB (MeNB), any local breakout bearer between different eNBs, and sending to a Mobile Management Entity (MME) a local home network ID of a target eNB or indication information for indicating that the local breakout bearer has been switched out from a source local home network; and determining, by the MME according to the received information, whether to trigger a deactivation process of the local breakout bearer.

When the MeNB sends to the MME the local home network ID of the target eNB, the MME compares the local home network ID of the target eNB with the local home network ID of the source eNB, and when the two IDs are different, triggers the deactivation process of the local breakout bearer.

The method further includes: comparing, by the MeNB, the local home network ID of the target eNB with the local home network ID of the source eNB, and when the two IDs are different, sending to the MME the indication information for indicating that the local breakout bearer has been switched away from a source local home network; triggering, by the MME, the deactivation process of the local breakout bearer after receiving the indication information.

When the target eNB is a SeNB, obtaining, by the MeNB, the local home network ID of the target SeNB comprises: sending, by the MeNB, a SeNB addition request to the SeNB, wherein a SeNB addition response returned to the MeNB by the SeNB contains the local home network ID of the SeNB.

The SeNB addition response contains the local home network ID of the SeNB when the SeNB addition request indicates the information of the local breakout bearer.

As can be seen, the embodiments of the present disclosure provide several architectures supporting local breakout. Based on these architectures, the MME sends to the MeNB the information of the local breakout bearer for the UE, and the MeNB determines the local home network to which the local breakout bearer belongs according to the received information. When the MeNB is to switch the local breakout bearer between different eNBs, the MeNB selects an eNB in the local home network to which the local breakout bearer belongs as a target eNB. In this way, the continuity of local breakout traffic may be ensured, thereby avoiding data loss.

Advantageous Effects of Invention

Based on these architectures supporting local breakout, when the MeNB switches any local breakout bearer between different eNBs, the MeNB sends to the MME the local home network ID of the target eNB or indication information for indicating that the local breakout bearer has been switched away from the source local home network. According to the received information, the MME determines whether to trigger a deactivation process of the local breakout bearer. In this way, the local breakout bearer may be released timely and reasonably, thereby saving system resources.

MODE FOR THE INVENTION

In order to make the object, technical solution and merits of the present disclosure clearer, the present disclosure will be illustrated in detail hereinafter with reference to the accompanying drawings.

FIGS. 3a-3d are diagrams illustrating four architectures supporting local breakout in a small cell architecture. In FIGS. 3a-3d, real lines represent streams on a local breakout bearer, and dashed lines represent normal streams on another bearer.

Figure 1:
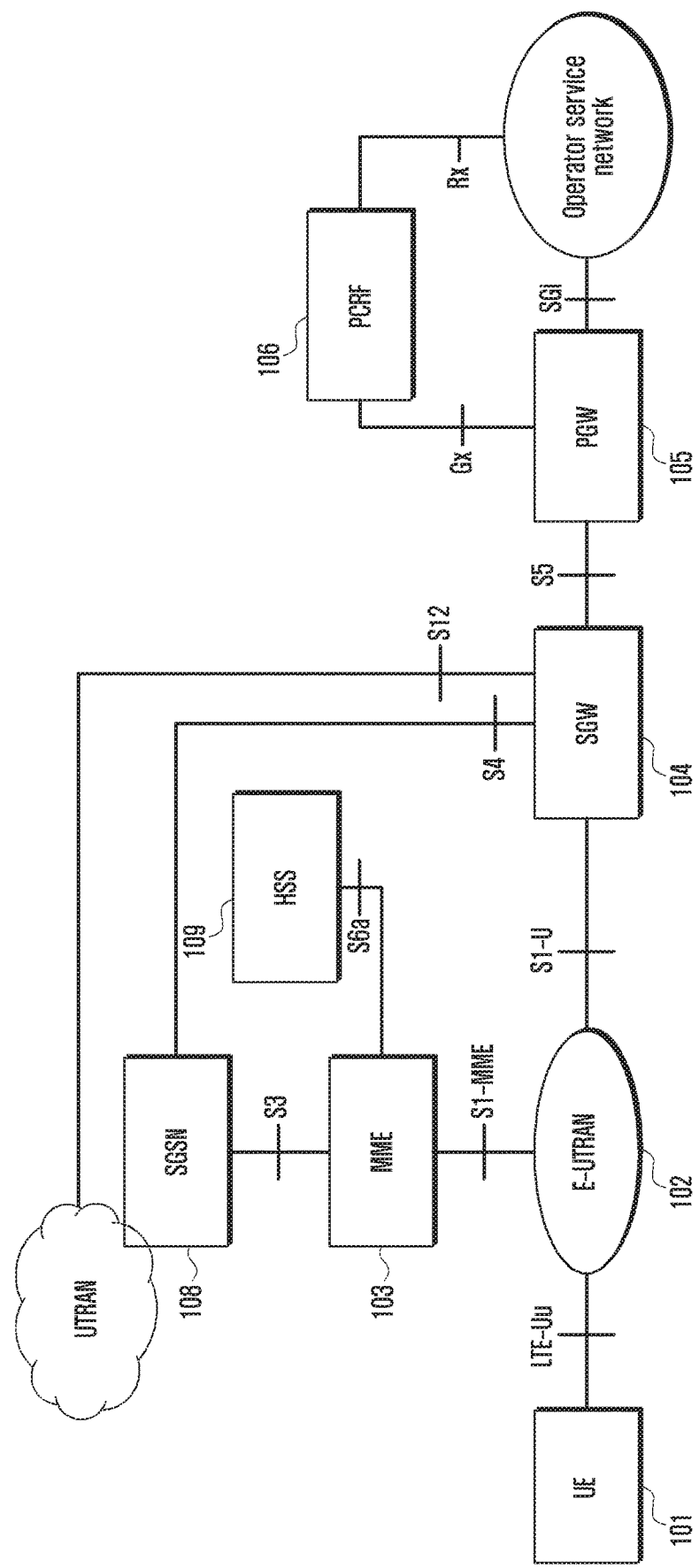
FIG. 1 is a diagram illustrating the structure of a SAE.
Figure 2:
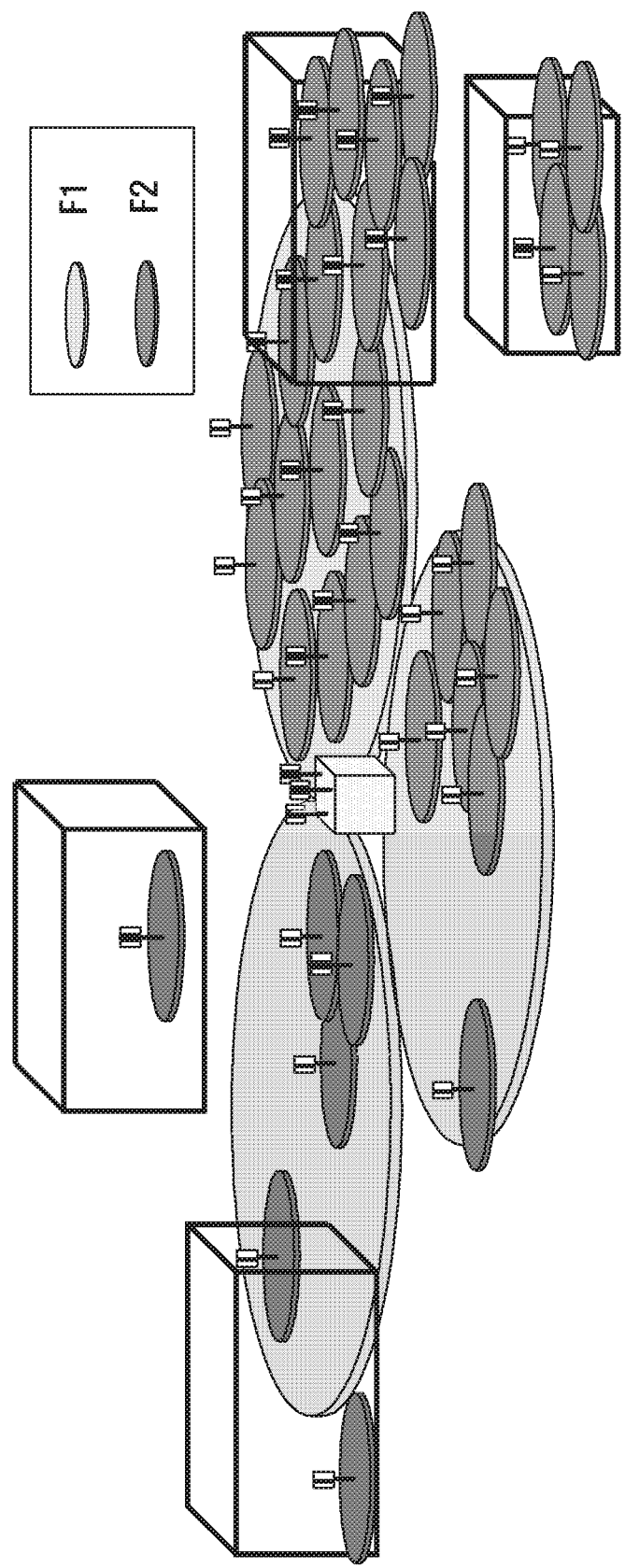
FIG. 2 is a diagram illustrating a scenario showing the enhancement of a small cell.
Figure 3A:
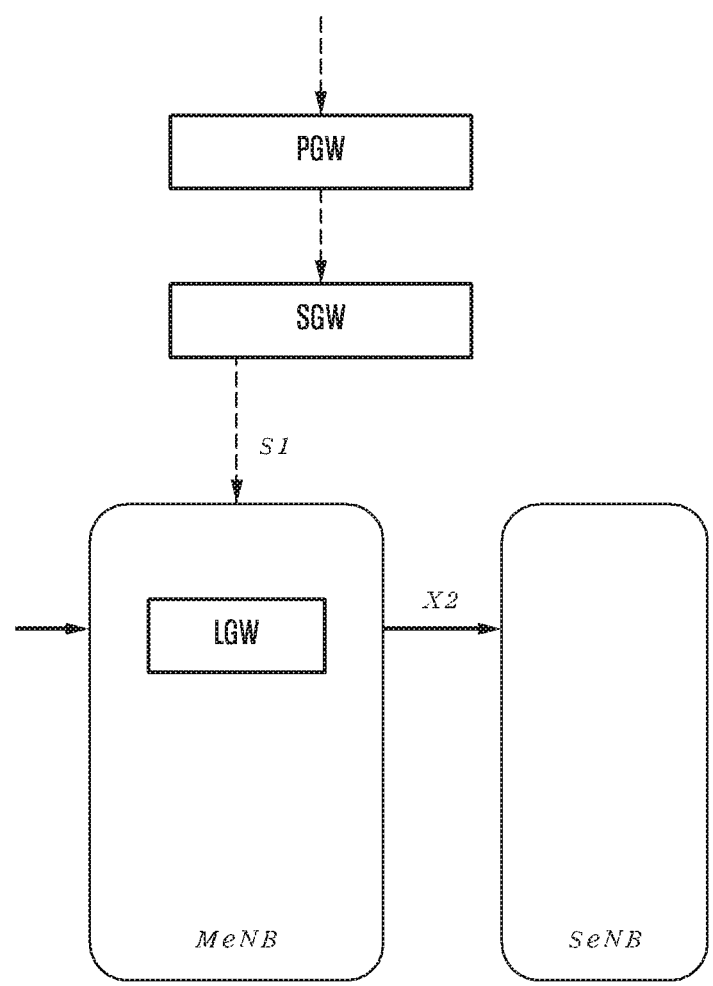
FIGS. 3a-3d are diagrams illustrating four architectures supporting local breakout in a small cell architecture.

FIG. 3a shows a first architecture. In the architecture shown in FIG. 3a, an LGW is located in a MeNB and is used as a unit of the MeNB, called an LGW unit. The LGW unit may implement functions of the LGW. Local breakout traffic is sent to the MeNB through the LGW, and then is sent to a SeNB. In this way, the backhaul of S1 may be saved.

Figure 3B:
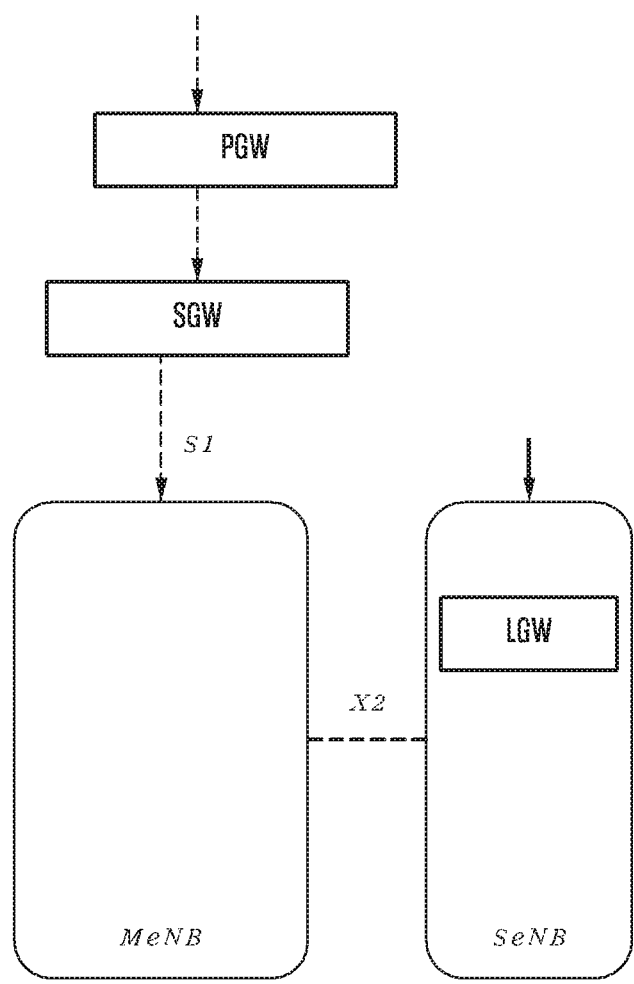

FIG. 3b shows a second architecture. In the architecture shown in FIG. 3b, an LGW is located in a SeNB and is used as a unit of the SeNB, called an LGW unit. The LGW unit may implement functions of the LGW. Local breakout traffic is sent to the SeNB directly. In this way, the backhauls of S1 and X2 may be saved.

Figure 3C:
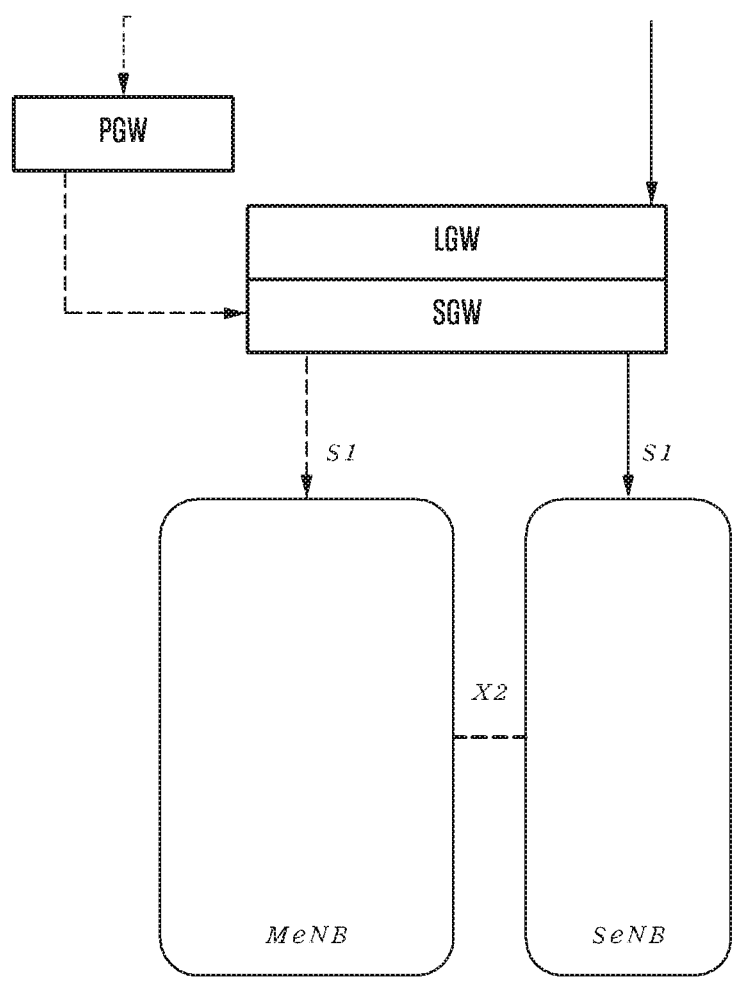

FIG. 3c shows a third architecture. In the architecture shown in FIG. 3c, an LGW is located in a local home network and is a separate entity. The LGW may implement functions of the LGW and an SGW. Local breakout traffic is sent to a SeNB or a MeNB through the LGW. In this way, the backhauls of S1 and X2 may be saved.

Figure 3D:
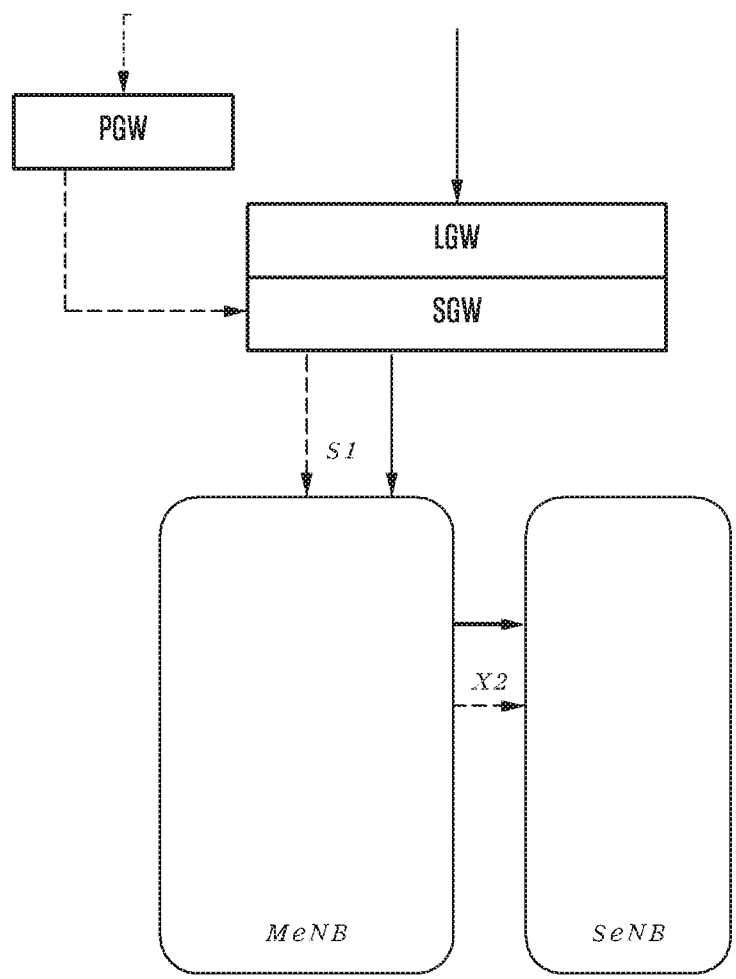

FIG. 3d shows a fourth architecture. In the architecture shown in FIG. 3d, an LGW is located in a local home network and is a separate entity. The LGW may implement functions of the LGW and an SGW. Local breakout traffic is sent to a MeNB through the LGW, and then is sent to a SeNB from the MeNB. In this way, the backhaul of S1 may be saved.

The above four architectures all support local breakout, and may save the backhaul of S1. The second and third architectures may further save the backhaul of X2.

Based on the above four architectures, an embodiment of the present disclosure also provides a method for supporting the continuity of local breakout traffic and a method for supporting bearer release, which will be illustrated hereinafter.

Figure 4:
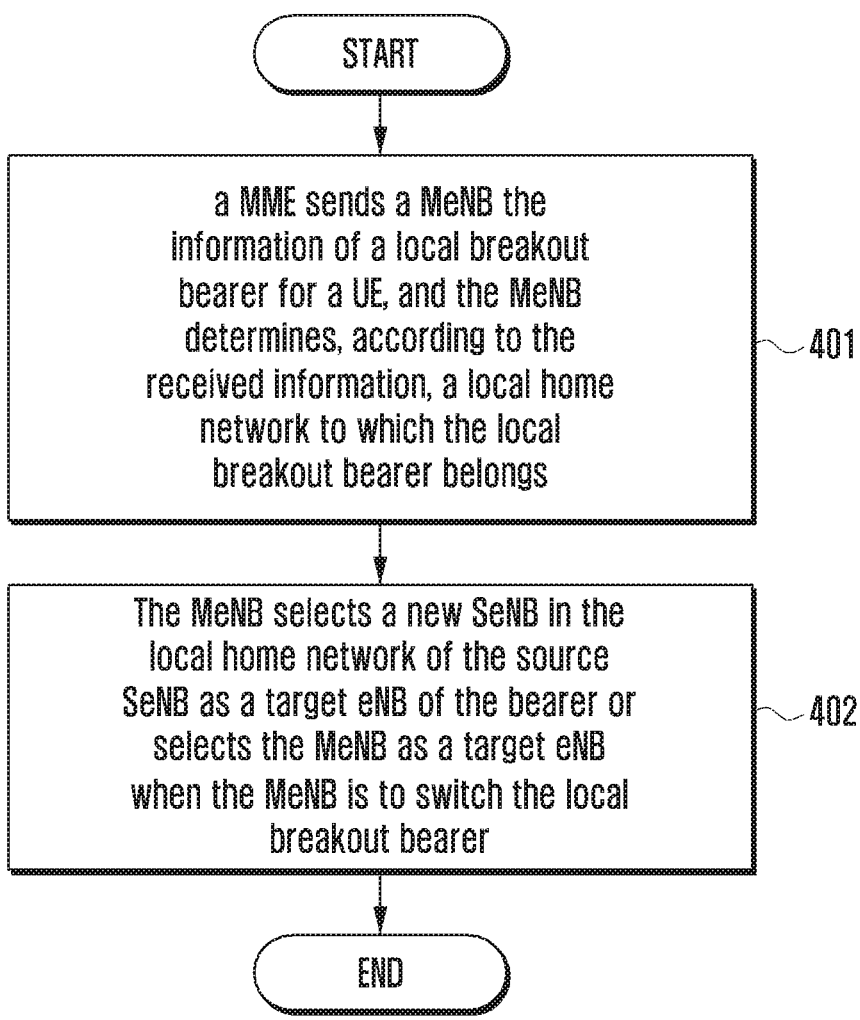
FIG. 4 is a flowchart illustrating a method for supporting the continuity of local breakout traffic in a method for supporting local breakout in a small cell architecture according to an embodiment of the present disclosure.

FIG. 4 is a flowchart illustrating a method for supporting the continuity of local breakout traffic in a method for supporting local breakout in a small cell architecture according to an embodiment of the present disclosure. The method for supporting the continuity of local breakout traffic may be applied to the above four architectures. The method may be implemented as follows.

At block 401, an MME sends a MeNB the information of a local breakout bearer for a UE, and the MeNB determines, according to the received information, a local home network to which the local breakout bearer belongs.

In an implementation, the information of the local breakout bearer may be an indication for indicating that the local breakout bearer is established for the UE and/or an indication for indicating that which bearer is local breakout bearer.

Herein, the MeNB is an end point of a UE S1 control plane. The interaction between the SeNB and a core network on the control plane may be performed through the MeNB. The main Radio Resource Control (RRC) functions and control of the UE on an air interface are also implemented in the MeNB. The local breakout bearer refers to a bearer accessing the outer through the local network without through a core network of an operator, for example, a Selected IP Traffic Offload (SIPTO) bearer or a Local IP Access (LIPA) bearer.

When the MeNB or the SeNB of the UE is located in one local home network, the MME may only send an indication for indicating to establish a local breakout bearer. After receiving the indication for indicating to establish the local breakout bearer, the MeNB may determine the local home network to which the local breakout bearer belongs, and may select a proper eNB in the local home network to establish the bearer.

If the MeNB is in multiple local home networks, or the MeNB and the SeNB of the UE are located in different local home networks, the MME may send to the MeNB the information for indicating that a bearer is a local breakout bearer and to which local home network the bearer belongs. The information sent to the MeNB may include an ID of the local home network. In this way, after receiving the local home network ID, the MeNB determines the local home network to which the local breakout bearer belongs according to the local home network ID, and selects an eNB in the local home network to establish the bearer. When the MME sends to the MeNB the ID of the local home network to which the local breakout bearer belongs, the MME may further send an indication of the local breakout bearer or may not send the indication of the local breakout bearer.

At block 402, when the MeNB is to switch the local breakout bearer between different eNBs, for example, switch the local breakout bearer from SeNB1 to SeNB2 or from the SeNB to the MeNB, the MeNB selects a new SeNB in the local home network of the source eNB as a target eNB of the bearer or selects the MeNB as the a eNB, thereby ensuring the continuity of the local breakout traffic.

According to the information sent to the MeNB at block 401, the MeNB may determine the local home network to which the local breakout bearer belongs. When the MeNB is to switch the local breakout bearer between different eNBs, the MeNB may select an eNB in the local home network of the source eNB as a target eNB according to the local home network to which the local breakout bearer belongs. The MeNB can obtain a local home network ID of a SeNB through multiple methods. For example, through an X2 establishment process, the configuration of an operator, an Automatic Neighbor Relation (ANR) process or a SeNB addition process between the MeNB and the SeNB, the MeNB may obtain the local home network ID of the SeNB.

And thus, the method for supporting the continuity of local breakout traffic terminates.

Figure 5:
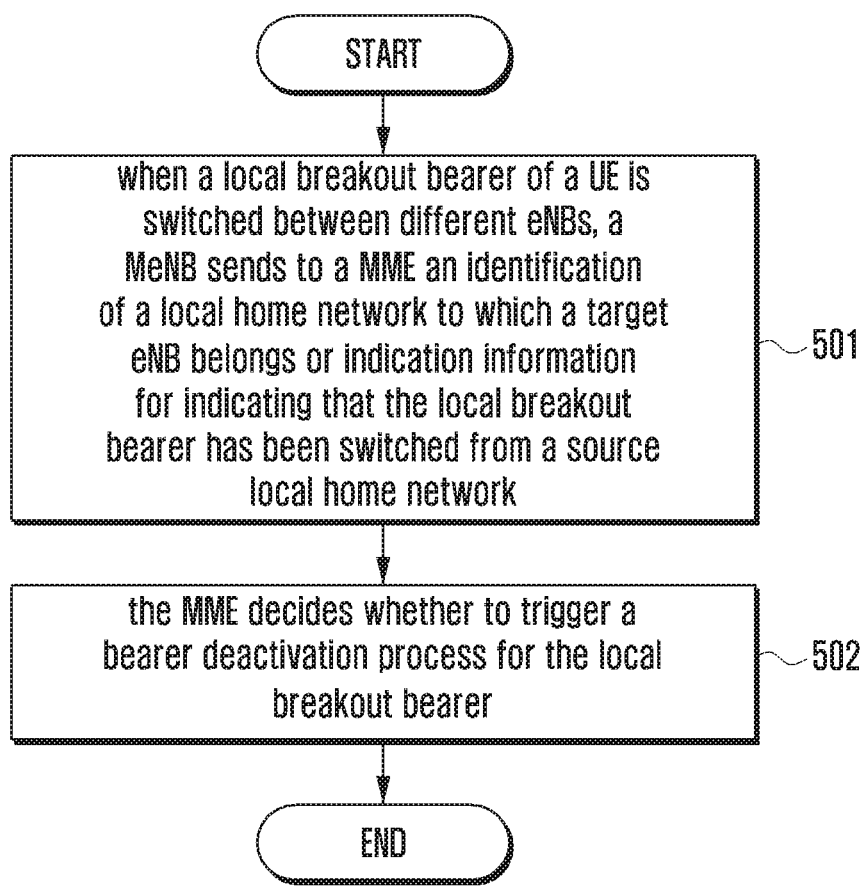
FIG. 5 is a flowchart illustrating a method for supporting bearer release in a method for supporting local breakout in a small cell architecture according to an embodiment of the present disclosure.

FIG. 5 is a flowchart illustrating a method for supporting bearer release in a method for supporting local breakout in a small cell architecture according to an embodiment of the present disclosure. The method for supporting bearer release may be applied to the above four architectures and may be implemented as follows.

At block 501, when a local breakout bearer of a UE is switched between different eNBs, for example, the local breakout bearer of the UE is switched from SeNB1 to SeNB2, a MeNB sends to a MME a local home network ID of a target eNB (for example, SeNB2) or indication information for indicating that the local breakout bearer is to be switched out from a source local home network.

When the target eNB is a SeNB, the MeNB may obtain the local home network ID of the target eNB through the description at block 402 or other methods. The MeNB may send to the MME the local home network ID of the target SeNB. Or, because the MeNB has obtained the local home network ID of the source SeNB (for example, SeNB1) and the local home network ID of the target SeNB (for example, SeNB2), the MeNB may compare the local home network ID of the source SeNB with the local home network ID of the target SeNB, and determine whether the local breakout bearer has been switched out from the source local home network. Accordingly, the MeNB may send to the MME an indication for indicating whether the local breakout bearer has been switched out from the source local home network. In order to save resources, the MeNB may send to the MME the indication for indicating whether the local breakout bearer has been switched away from the source local home network when the bearer of the UE is the local breakout bearer and the local breakout bearer has been switched out from the source local home network.

At block 502, the MME decides whether to trigger a bearer deactivation process.

The MME triggers the bearer deactivation process for the local breakout bearer that has been switched out from the source local home network. The deactivation process is not illustrated in detail herein. The local breakout bearer may be a LIPA bearer, a SIPTO bearer or another local breakout bearer.

And thus, the method for supporting the bearer release terminates.

Taking the third architecture as an example, the above two methods are implemented as follows.

Figure 6:
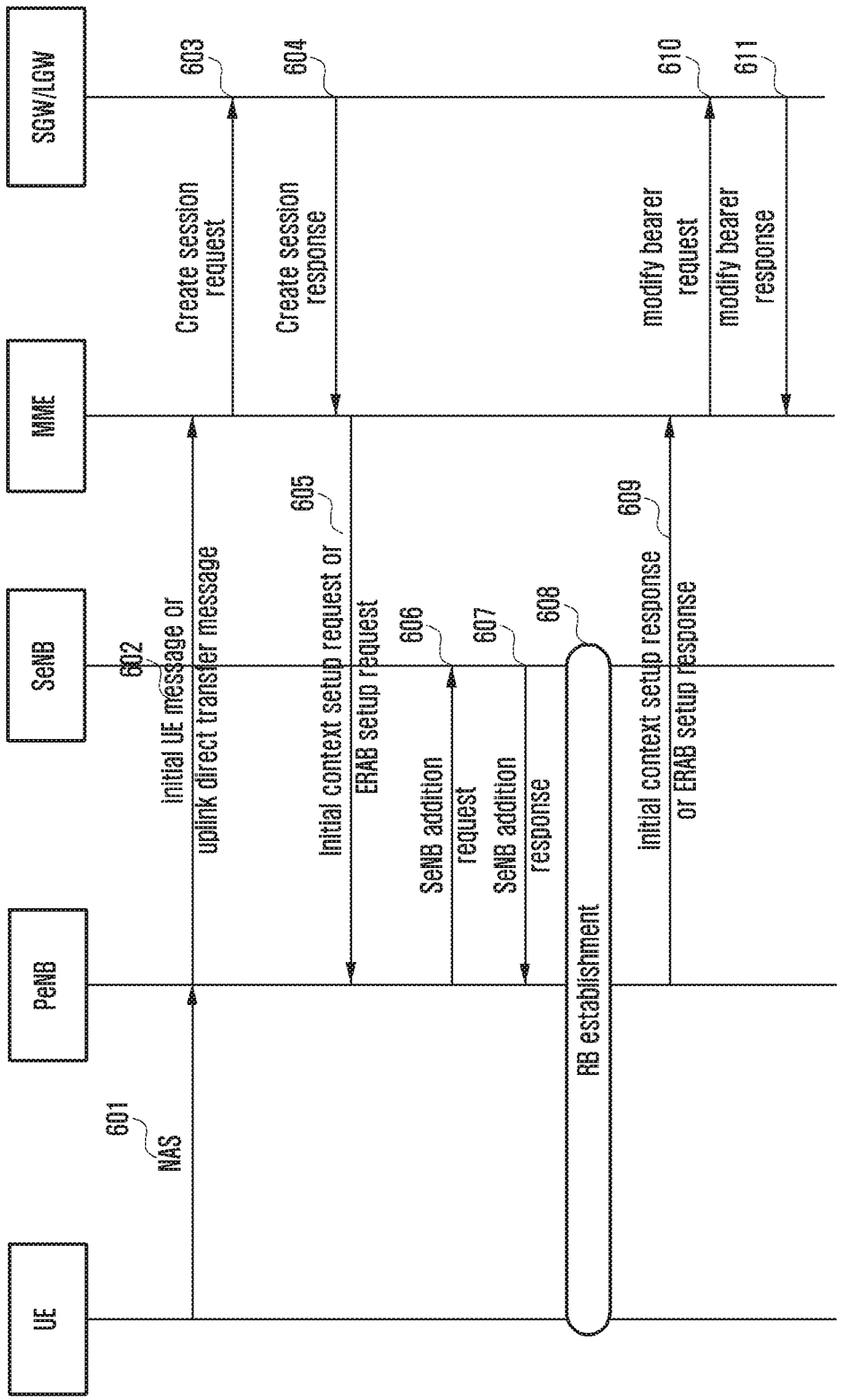
FIG. 6 is a flowchart illustrating a method for supporting local breakout in a small cell architecture according to an embodiment of the present disclosure.

FIG. 6 is a flowchart illustrating a method for supporting local breakout in a small cell architecture according to an embodiment of the present disclosure. Detailed descriptions unrelated to the present disclosure are omitted. The method includes following blocks.

At block 601, a UE sends a Non-Access Stratum (NAS) message to an eNB through an RRC message.

At block 602, a MeNB sends an initial UE message or an uplink direct transfer message to a MME. The initial UE message or the uplink direct transfer message contains the NAS message received from the UE.

When the MeNB is located in a local home network, or a SeNB of the UE is located in a local home network, the MeNB sends to the MME through a S1 message a local home network ID of the MeNB and/or an ID of the local home network to which the SeNB of the UE belongs. The SeNB of the UE means that the MeNB establishes a bearer in the SeNB for the UE or the MeNB learns according to the measurement of the UE that the UE is in the coverage of the SeNB.

If the MeNB is located in a local home network, the MeNB may send to the MME the local home network ID of the MeNB. When the MeNB is located in multiple local home networks, because the coverage of the MeNB is large, maybe there are multiple SeNBs belonging to different local home networks in the coverage of the MeNB. In this situation, the MeNB may only send to the MME the local home network ID of the SeNB of the UE, or the MeNB may further send to the MME the IDs of all local home networks to which the MeNB belongs. When the MeNB is not in the local home network, the MeNB sends to the MME the local home network ID of the SeNB where the UE is located.

At block 603, the MME sends a create session request to an SGW. According to the received NAS message, if the UE requests for local breakout traffic, for example, SIPTO at local network, the MME determines, according to the local home network ID received from the MeNB and the subscription information of the UE, whether to establish a SIPTO at local network bearer for the UE. When the MME determines to establish the SIPTO at local network bearer for the UE, the MME selects an SGW/LGW for the UE according to a rule. The SGW and the LGW for supporting SITPO at local network are located together.

At block 604, the SGW/LGW sends a create session response to the MME.

At block 605, the MME sends an initial context setup request or an Evolved Radio Access Bearer (ERAB) setup request to the MeNB.

If the MME decides to establish a local breakout bearer for the UE, for example, a SIPTO at local network bearer, the MME sends to the MeNB the information of the local breakout bearer through the initial context setup request or the ERAB setup request. The information of the local breakout bearer may be an indication of establishing the local breakout bearer for the UE and/or an indication for indicating that which bearer is the local breakout bearer. When the MME receives one local home network ID from the MeNB at block 602, the MME may only send the indication for indicating that which bearer is the local breakout bearer to the MeNB through the initial context setup request or the ERAB setup request, so as to indicate the MeNB to establish the local breakout bearer for the UE. When the MME receives multiple IDs of local home networks from the MeNB at block 602, the MME sends to the MeNB, through the initial context setup request or the ERAB setup request, the information for indicating that which bearer is the local breakout bearer and the local breakout bearer belongs to which local home network. That is, the information includes the ID of the local home network to which the local breakout bearer belongs. When the local home network ID exists, a local breakout bearer indication may not be contained.

At block 606, the MeNB determines the local home network to which the local breakout bearer belongs, and selects an eNB in the local home network to establish the bearer for the UE.

When the MeNB sends one local home network ID to the MME, the MeNB may determine the local home network to which the local breakout bearer belongs according to the local home network ID sent to the MME and the local breakout bearer indication received from the MME, and select an eNB in the local home network to establish the bearer.

When the MeNB sends one or more IDs of local home networks to the MME, the MeNB may determine the local home network to which the local breakout bearer belongs according to the local home network ID received from the MME or according to the local home network ID and a local breakout indication, and selects an eNB in the local home network to establish the bearer. The eNB selected may be the MeNB or a SeNB.

When selecting a SeNB to establish the local breakout bearer, the MeNB sends a SeNB addition request to the SeNB. The SeNB addition request may contain the local breakout indication.

The SeNB sends the local home network ID of the SeNB to the MeNB at block 607. Or, the SeNB determines, according to the local breakout indication contained in the SeNB addition request, whether to contain the local home network ID at block 607.

At block 607, the SeNB assigns resources, and sends a SeNB addition response to the MeNB.

The SeNB addition response may contain the local home network ID of the SeNB. Or, the SeNB addition response contains the local home network ID of the SeNB when the SeNB addition request contains the local breakout indication.

At block 608, a Radio Bearer (RB) over air interface is established for the UE.

At block 609, the MeNB sends an initial context setup response or an ERAB setup response to the MME.

At block 610, the MME sends a modify bearer request to the SGW/LGW.

At block 611, the SGW/LGW sends a modify bearer response to the MME.

After establishing the local breakout bearer, if the local breakout bearer is to be switched, the MeNB may select a target eNB in the local home network to which the local breakout bearer belongs.

And thus, the method shown in FIG. 6 terminates.

Figure 7:
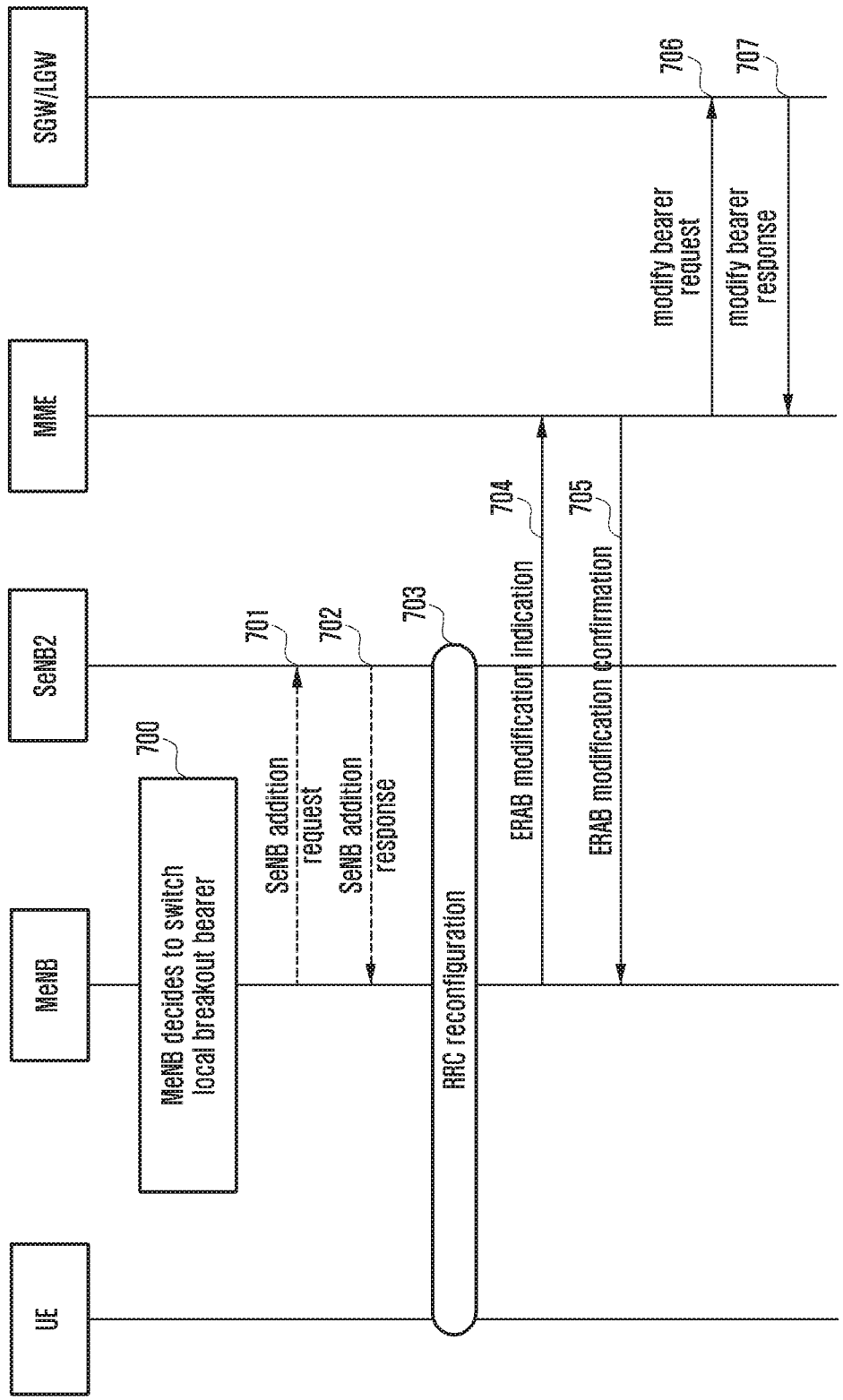
FIG. 7 is a flowchart illustrating a method for supporting local breakout in a small cell architecture according to another embodiment of the present disclosure.

FIG. 7 is a flowchart illustrating a method for supporting local breakout in a small cell architecture according to another embodiment of the present disclosure. Detailed descriptions unrelated to the present disclosure are omitted. The method includes following blocks.

At block 700, a MeNB decides to switch a local breakout bearer. For example, it is determined according to the measurement result of UE that a SeNB (for example, SeNB1) where the local breakout bearer is established is unavailable, or the load of SeNB1 is too high. The MeNB decides to switch the local breakout bearer to a new SeNB or the MeNB. If the target eNB is a new SeNB, block 701 is performed. If the target eNB is the MeNB, block 703 is performed directly.

At block 701, if the MeNB decides to switch the local breakout bearer to the new SeNB (for example, SeNB2), the MeNB sends a SeNB addition request to SeNB2. The SeNB addition request may contain a local breakout indication. SeNB2 sends to the MeNB a local home network ID of the SeNB2 at block 702. Or, the SeNB determines, according to the local breakout indication contained in the SeNB addition request, whether to contain the local home network ID at block 702.

At block 702, SeNB2 assigns resources, and sends a SeNB addition response to the MeNB.

The SeNB addition response may contain the local home network ID of SeNB2. Or, when the SeNB addition request contains the local breakout indication, the SeNB addition response contains the local home network ID of the SeNB2.

At block 703, the MeNB reconfigures the UE. The MeNB sends an RRC reconfiguration request to the UE, and the UE sends an RRC reconfiguration response to the MeNB.

At block 704, the MeNB sends an ERAB modification indication to a MME. The MeNB sends to the MME a local home network ID of a new eNB (for example, SeNB2 or the MeNB) or indication information for indicating that the local breakout bearer has been switched out from the source local home network.

The MeNB may obtain the local home network ID of SeNB2 according to the description at block 402 or block 702. The MeNB sends the local home network ID of SeNB2 to the MME.

Or, because the MeNB has obtained the local home network ID of the source SeNB (for example, SeNB1) and the local home network ID of the target SeNB (for example, SeNB2), the MeNB may compare the local home network ID of the source SeNB with the local home network ID of the target SeNB, and determine whether the local breakout bearer has been switched out from the source local home network. Accordingly, the MeNB may send to the MME an indication for indicating whether the local breakout bearer has been switched out from the source local home network. In order to save resources, the MeNB may send to the MME the indication for indicating whether the local breakout bearer has been switched out from the source local home network when the bearer of the UE is the local breakout bearer and the local breakout bearer has been switched out from the source local home network.

At block 705, the MME sends an ERAB modification indication confirmation message to the MeNB.

At block 706, the MME sends a modify bearer request to the SGW/LGW.

At block 707, the SGW/LGW sends a modify bearer response to the MME.

For a local breakout bearer, if the MME determines, according to the information received from the MeNB, for example, the local home network ID of the new eNB or the indication information for indicating that the local breakout bearer has been switched out from the source local home network, that the local breakout bearer has been switched out from the source local home network, the MME triggers the deactivation process of the local breakout bearer. The MME may perform or not perform blocks 706 and 707 when triggering the deactivation process of the local breakout bearer. The deactivation process of the local breakout bearer is not illustrated in detail herein.

In the embodiments of the present disclosure, the order of blocks 705 and 706/707 may be changed, which means the MME may send ERAB modification confirmation message after receiving the modify bearer response message from the SGW/PGW.

And thus, the method shown in FIG. 7 terminates.

The foregoing is only preferred embodiments of the present disclosure and is not used to limit the protection scope of the present disclosure. Any modification, equivalent substitution and improvement without departing from the spirit and principle of the present disclosure are within the protection scope of the present disclosure.

The invention claimed is:

1. A method performed by a master base station in a communication system, the method comprising:
   transmitting, to a mobility management entity, an initial user equipment (UE) message including a local home network (LHN) identification (ID) of the master base station;
   receiving, from the mobility management entity, an initial context setup request message;
   transmitting a secondary base station addition request message to a secondary base station having an LHN ID that is same as the LHN ID of the master base station; and
   receiving, from the secondary base station, a secondary base station addition request acknowledgement message as a response to the secondary base station addition request message,
   wherein an LHN corresponding to the LHN ID of the master base station includes a local gateway that is standalone with the master base station and the secondary base station.

2. The method of claim 1, wherein the LHN ID of the master base station and subscription data of a UE are used to establish a local breakout bearer for the master base station.

3. The method of claim 1,
   wherein the master base station has connectivity for selected internet protocol traffic offload (SIPTO) at the LHN via the local gateway, and
   wherein data for the SIPTO is transmitted from the local gateway to the master base station.

4. The method of claim 1, further comprising:
   transmitting, to the secondary base station, a request message including the LHN ID of the master base station; and
   receiving, from the secondary base station, a response message including the LHN ID of the secondary base station as a response to the request message.

5. A method performed by a secondary base station in a communication system, the method comprising:

receiving a secondary base station addition request message from a master base station having a local home network (LHN) identification (ID) that is same as an LHN ID of the secondary base station; and transmitting, to the master base station, a secondary base station addition request acknowledgement message as a response to the secondary base station addition request message, wherein an LHN corresponding to the LHN ID of the secondary base station includes a local gateway that is standalone with the master base station and the secondary base station.

6. The method of claim 5, wherein the LHN ID of the master base station is used to establish a local breakout bearer for the master base station.

7. The method of claim 5,
wherein the secondary base station has connectivity for selected internet protocol traffic offload (SIPTO) at the LHN via the local gateway, and
wherein data for the SIPTO is transmitted from the local gateway to the secondary base station.

8. The method of claim 5, further comprising:
receiving, from the master base station, a request message including the LHN ID of the master base station; and
transmitting, to the master base station, a response message including the LHN ID of the secondary base station as a response to the request message.

9. A master base station in a communication system, the master base station comprising:
a transceiver; and
a controller coupled with the transceiver and configured to:
transmit, to a mobility management entity, an initial user equipment (UE) message including a local home network (LHN) identification (ID) of the master base station,
receive, from the mobility management entity, an initial context setup request message,
transmit, a secondary base station addition request message to a secondary base station having an LHN ID that is same as the LHN ID of the master base station, and
receive, from the secondary base station, a secondary base station addition request acknowledgement message as a response to the secondary base station addition request message,
wherein an LHN corresponding to the LHN ID of the master base station includes a local gateway that is standalone with the master base station and the secondary base station.

10. The master base station of claim 9, wherein the LHN ID of the master base station and subscription data of a UE are used to establish a local breakout bearer for the master base station.

11. The master base station of claim 9,
wherein the master base station has connectivity for selected internet protocol traffic offload (SIPTO) at the LHN via the local gateway, and
wherein data for the SIPTO is transmitted from the local gateway to the master base station.

12. The master base station of claim 9, wherein the controller is further configured to:
transmit, to the secondary base station, a request message including the LHN ID of the master base station, and
receive, from the secondary base station, a response message including the LHN ID of the secondary base station as a response to the request message.

13. A secondary base station in a communication system, the secondary base station comprising:
a transceiver; and
a controller coupled with the transceiver and configured to:
receive a secondary base station addition request message from a master base station having a local home network (LHN) identification (ID) that is same as an LHN ID of the secondary base station, and
transmit, to the master base station, a secondary base station addition request acknowledgement message as a response to the secondary base station addition request message,
wherein an LHN corresponding to the LHN ID of the secondary base station includes a local gateway that is standalone with the master base station and the secondary base station.

14. The secondary base station of claim 13, wherein the LHN ID of the master base station is used to establish a local breakout bearer for the master base station.

15. The secondary base station of claim 13,
wherein the secondary base station has connectivity for selected internet protocol traffic offload (SIPTO) at the LHN via the local gateway, and
wherein data for the SIPTO is transmitted from the local gateway to the secondary base station.

16. The secondary base station of claim 13, wherein the controller is further configured to:
receive, from the master base station, a request message including the LHN ID of the master base station, and
transmit, to the master base station, a response message including the LI-IN ID of the secondary base station as a response to the request message.

\* \* \* \* \*